United States Patent [19]

Downing et al.

[11] Patent Number: 4,870,485

[45] Date of Patent: Sep. 26, 1989

[54] THREE DIMENSIONAL IMAGE GENERATING APPARATUS HAVING A PHOSPHOR CHAMBER

[75] Inventors: Elizabeth A. Downing, Sunnyvale; Bernardo Torres, Union City, both of Calif.

[73] Assignee: FMC Corporation, Chicago, Ill.

[21] Appl. No.: 248,056

[22] Filed: Sep. 23, 1988

[51] Int. Cl.⁴ .............................................. H04N 13/00
[52] U.S. Cl. .......................................... 358/90; 358/88
[58] Field of Search ....................... 358/88, 90, 91, 92, 358/89, 3, 242; 340/758; 350/3.6–3.68

[56] References Cited

U.S. PATENT DOCUMENTS

| | | | |
|---|---|---|---|
| 2,604,607 | 7/1952 | Howell | 358/88 X |
| 3,154,636 | 10/1964 | Schwertz | 358/88 |
| 3,829,838 | 8/1974 | Lewis et al. | 350/3.66 X |
| 4,408,277 | 10/1983 | Cortellini et al. | 358/90 X |
| 4,520,387 | 5/1985 | Cortellini | 358/90 |

*Primary Examiner*—James J. Groody
*Assistant Examiner*—Victor R. Kostak
*Attorney, Agent, or Firm*—Lloyd B. Guernsey; R. C. Kamp; R. B. Megley

[57] ABSTRACT

Three dimensional television viewing apparatus having an image chamber which produces images that can be viewed from a plurality of directions. An imaging phosphor is distributed in a three dimensional chamber. A pair of energy beams are directed by a pair of scanning systems inside the chamber to an intersection where visible light is released from the imaging phosphor. The point of intersection of the two beams is moved inside the chamber to produce a visible three dimensional image.

5 Claims, 3 Drawing Sheets

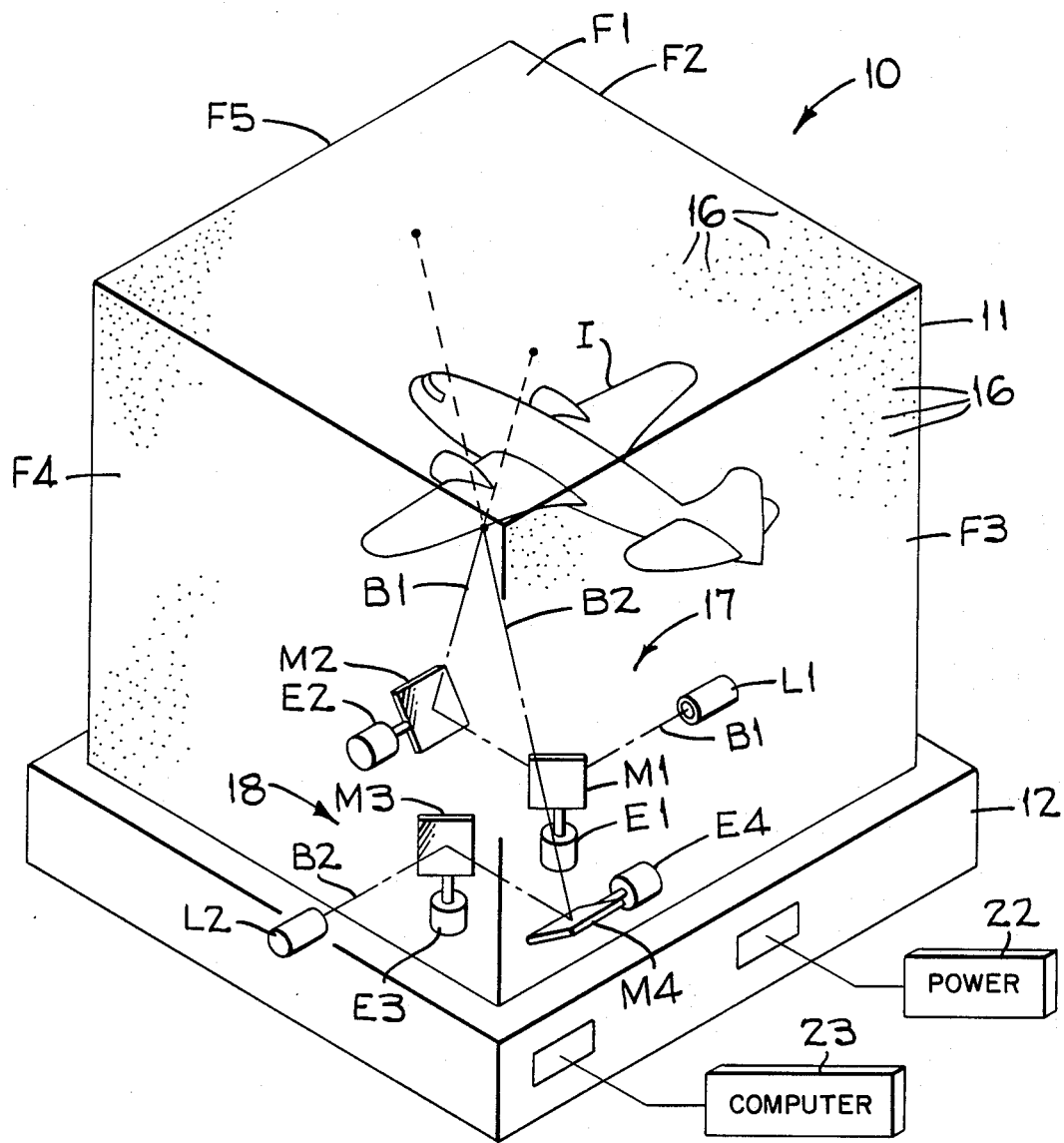

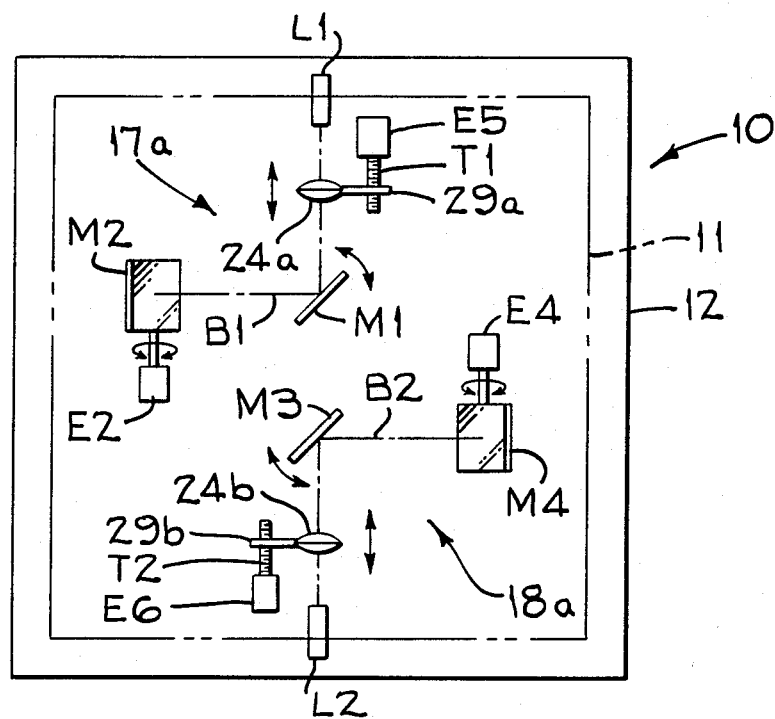
FIG_2
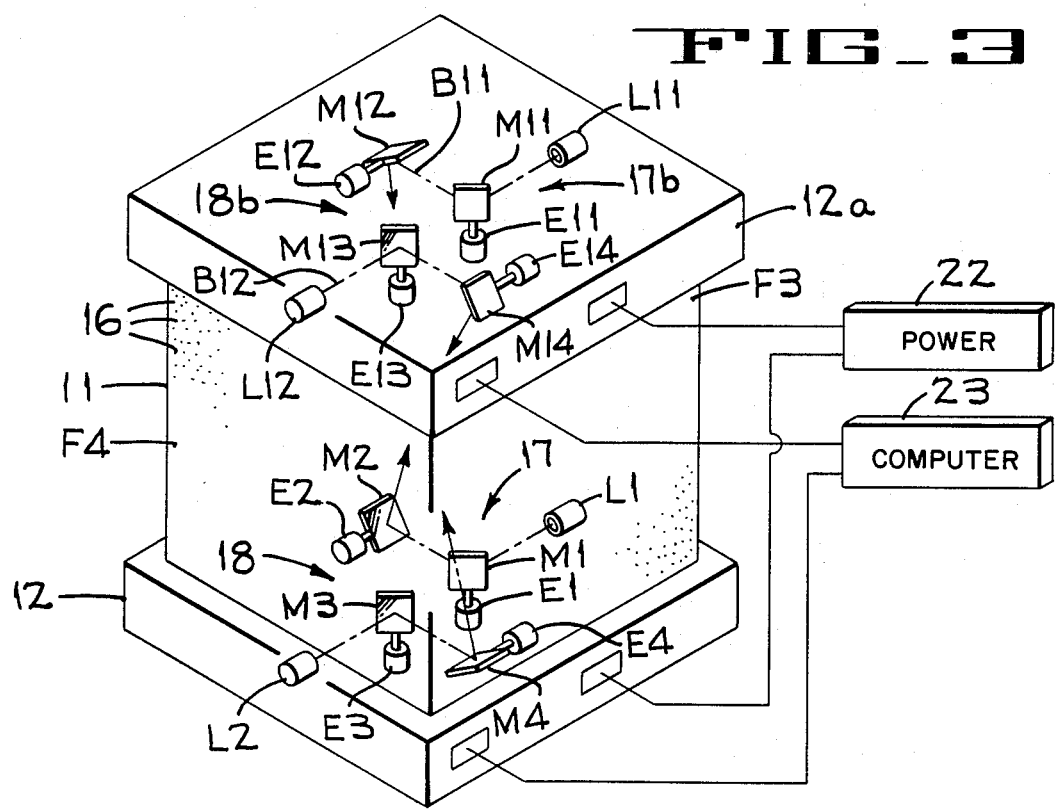
FIG_3

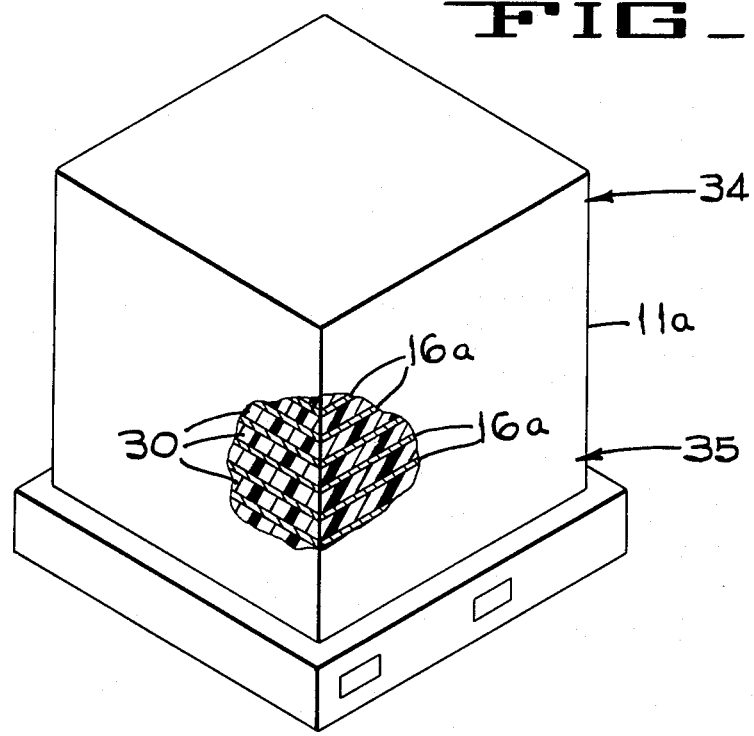
FIG_4
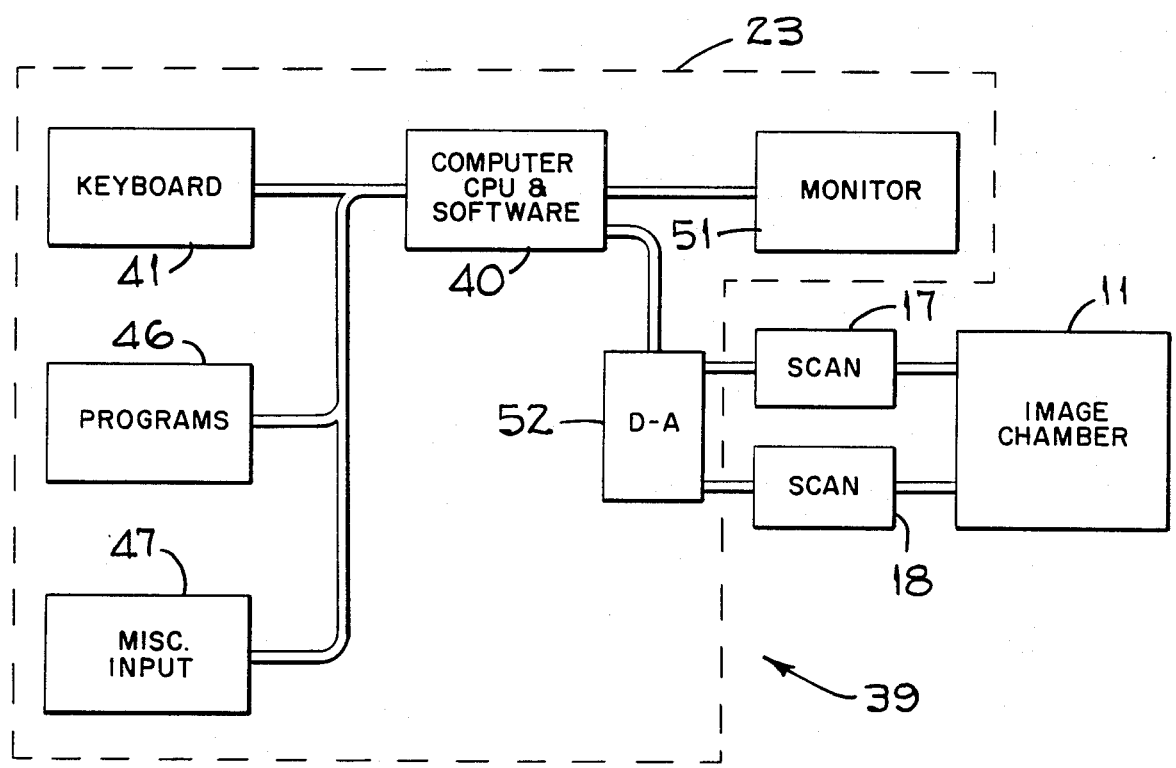
FIG_5

THREE DIMENSIONAL IMAGE GENERATING APPARATUS HAVING A PHOSPHOR CHAMBER

BACKGROUND OF THE INVENTION

The present invention pertains to a system for producing television type images, and more particularly, to apparatus for producing three dimensional images.

Television receivers and other display systems each use a cathode ray tube having a fluorescent coating deposited on a slightly curved screen inside the tube. In a black and white tube an electron gun directs a beam of electrons toward the screen with the electron beam being scanned over the surface of the screen by vertical and horizontal deflection systems. A control grid varies the amount of current in the beam to vary the brightness of different areas on the screen. In a color tube a trio of beams are each intensity controlled and each beam is directed toward one of three colors of phosphor on the screen. In both black and white and in color television the image is produced in only two dimensions and can be viewed only from the front of the screen, which is opposite from the side of the screen containing the phosphor.

SUMMARY OF THE INVENTION

The present invention uses a three dimensional image chamber having an imaging phosphor distributed through the chamber to produce three dimensional images. These images can be viewed from a wide variety of angles, such as from the front, back, sides and top of the chamber. The imaging phosphor is a rapidly-discharging, high conversion efficiency, electron trapping type which stores energy from a charging energy beam for a very short time, such as a few microseconds. The imaging phosphor releases photons of visible light when energy from a triggering energy beam reaches phosphor containing energy from the charging beam. This triggering results in radiation of visiblelight from each point where the charging energy beam crosses the triggering energy beam. A first scanning system directs the charging energy beam to scan through a space in the image chamber and a second scanning system directs the triggering energy beam to scan through space in the image chamber. These two energy beams intersect at a series of points in space to produce a three dimensional image inside the image chamber. The energy beams can be provided by a pair of lasers with one beam in the infrared region and the other in the blue, green, or ultraviolet portion of the spectrum.

BRIEF DESCRIPTION OF THE DRAWINGS

FIG. 1 is a perspective view of the present invention illustrating the positions of the source of beams and the scanning systems relative to the image chamber.

FIG. 2 is a top view of the beam sources and scanning systems including a means for focusing the beams.

FIG. 3 is a perspective view of a dual set of beam sources and scanning systems to provide more uniform brightness in the image chamber.

FIG. 4 is a perspective view of a layered type of image chamber.

FIG. 5 is a block diagram of a control system for the scanning systems.

DESCRIPTION OF THE PREFERRED EMBODIMENT

A three dimensional image generating apparatus 10 of the present invention (FIG. 1) includes an image chamber 11 mounted on a support base 12. The image chamber 11 is filled with a plurality of imaging phosphorous particles 16 which can be suspended in a liquid inside chamber 11, or the particles 16 can be encased in a solid transparent plastic. When particles 16 are suspended in a liquid the particles must be very fine so they remain in suspension due to Brownian motion or a blower of some type (not shown) can be used to provide circulation of the liquid to provide uniform distribution of particles 16 throughout the liquid. The particles 16 can also be suspended in a gel or in a gas enclosed inside chamber 11.

Base 12 includes a pair of scanning systems 17, 18 (FIG. 1) each having a laser beam source L1, L2, a pair of reflecting mirrors M1–M2, M3–M4 with each mirror driven by an electric motor E1–E2, E3–E4. Power to operate the laser sources L1, L2 is provided by a power source 22, and signals to control operation of motors M1–M4 are provided by a computer 23. Mirrors M1, M2 direct a first laser charging beam B1 upward to store energy in particles 16 along the route of beam B1. Mirrors M3, M4 direct a second laser triggering beam B2 upward to trigger the release of energy by particles 16 where beams B1 and B2 intersect. These particles at the intersection of beams B1 and B2 emit light in the visible spectrum and form an image I which is the result of all of the points of intersection of beams B1 and B2. The scanning is done so rapidly that the emitted light forms a three dimensional image for the human eye. All of the faces F1–F5 (FIG. 1) of chamber 11 are coated with a selective absorbing filter material which allows visible light to be emitted from chamber 11, but prevents any laser beams from leaving chamber 11 and causing possible damage to eyes of people nearby. The filter material also prevents the laser beams from reflecting from faces F1–F5 and interfering with the image I formed in chamber 11. The scanning system shown in FIG. 1 uses vector scanning, but a raster scanning system can also be used to provide three dimensional images in image chamber 11. The image chamber is shown as a cube, but it should be understood that a sphere or other solid forms of the chamber can be used.

FIG. 2 shows a top view of a pair of scanning systems 17a, 18a each having a lens 24a, 24b, a motor E5, E6, a threaded shaft T1, T2 and a threaded bracket 29a, 29b for providing a focus action of laser beams B1, B2. Lens 24a, 24b improve the sharpness of an image inside image chamber 11 (FIG. 1) especially when large images are shown.

FIG. 3 is a perspective view of another embodiment of the three dimensional image generating apparatus of FIG. 1, and uses a dual scanning system for both the energy charging and the energy triggering beams. As the laser beams B1, B2 of FIG. 1 travel upward they each lose energy to phosphorous particles 16 which they encounter in their upward travel. As a result particles 16 near the top of image chamber 11 store less energy than particles near the bottom of the chamber. This causes any image formed in chamber 11 to be brighter near the bottom and less bright at the top of the image. A pair of upper scanning systems 17b, 18b (FIG. 3) simultaneously scan the same portion of an image that is scanned by lower scanning systems 17, 18 to increase the brightness of the scanned image, especially near the top portion of the image. An upper pair of laser sources L11, L12, a plurality of mirrors M11–M14 and a plurality of electric motors E11–E14 are controlled by computer 23 and power for the lasers is provided by power source 22. Bases 12, 12a could also be placed against other faces of image chamber 11, such as against faces F2, F4; however, by doing so the number of faces of chamber 11 available for viewing the internal image is reduced. A more practical arrangement would be with a first base mounted below chamber 11 and the other base mounted on the top or on one side of the chamber.

Another embodiment of an image chamber 11a disclosed in FIG. 4 includes a plurality of plastic sheets 30 each having a coating of phosphorous particles 16a. The density of coating 16a varies from a top portion 34 of chamber 11a to a bottom portion 35 with a low density of coating on the lower sheets 30 and a gradual increase in the density of coating on sheets progressing toward top portion 34. When particles 16 are uniformly distributed throughout image chamber 11 (FIG. 1) the brightness of image I decreases from bottom to top as explained above. By increasing the density of particles 16 increase from bottom 35 to top 34 (FIG. 4) the brightness of image I can be substantially uniform from top to bottom while using a single pair of scanning systems 17, 18 as in FIG. 1.

A three dimensional control system 39 for controlling the formation of images I in image chamber 11 is disclosed in FIG. 5. The computer 23 (FIGS. 1, 3, 5) includes a central processing unit (CPU) 40 with appropriate software for receiving control signals from a keyboard 41, from a source of programs 46 and from a source of miscellaneous input 47. Input 47 could include a television camera or other source of input signals. A monitor 51 enables a human operator to observe output signals from CPU 40. CPU 40 provides control signals to a digital-to-analog converter 52 which operates scanning systems 17, 18 (FIGS. 1, 5), and systems 17a, 18a, 17b, 18b (FIGS. 2, 3). The software for operating systems 17a, 18a, 17b, 18b may need to be slightly different than the software used to operate systems 17, 18.

Special programs and software can be loaded into program source 46 (FIG. 5) to control the output of laser sources L1, L2 (FIG. 1) and provide uniform brightness throughout image I while using a single pair of scanning systems 17, 18. Computer 23 can cause an output from laser sources L1, L2 to provide relatively bright lines in a lower portion of image chamber 11 and can cause laser sources L1, L2 to provide a progressively larger output as the laser beams scan toward a top portion of chamber 11. This larger output of the laser sources compensates for loss of energy as the laser beam moves upward through the chamber 11.

Thus, the present invention provides a three dimensional image generating apparatus having a three dimensional image inside an image chamber. The image can be viewed from a wide variety of angles. An imaging phosphor distributed through the image chamber is excited by a pair of intersecting laser beams which cause the phosphor to emit visible light and form an image as the intersecting beams move through the image chamber.

Although the best mode contemplated for carrying out the present invention has been herein shown and described, it will be apparent that modification and variation may be made without departing from what is regarded to be the subject matter of the invention.

What is claimed is:

1. Apparatus for generating three dimensional images comprising:
    a three dimensional chamber;
    an imaging phosphor distributed through said image chamber;
    first and second charging sources each emitting a charging energy beam;
    first, second, third and fourth scanning systems, said first scanning system directing said first charging energy beam into said image chamber from a first side of said image chamber, said second scanning system directing said second charging energy beam into said image chamber from a second side of said image chamber; and
    first and second triggering sources each emitting a triggering beam, said third scanning system directing said first triggering beam into said image chamber from said first side of said image chamber, said fourth scanning system directing said second triggering beam into said image chamber from said second side of said image chamber, said first and said second charging energy beams and said first and said second triggering energy beams intersecting inside said image chamber and causing said imaging phosphor to release visible light energy at said intersection.

2. Apparatus for generating three dimensional images as defined in claim 1 including a selective absorbing filter material, said filter material coating a portion of a surface of said image chamber to prevent said charging energy beams and said triggering energy beams from escaping from said image chamber and causing possible damage to objects nearby.

3. Apparatus for generating three dimensional images as defined in claim 1 including a control system, and means for connecting said control system to said first, second, third and fourth scanning systems to direct said charging energy beams and said triggering energy beams into said image chamber.

4. Apparatus for generating three dimensional images as defined in claim 1 wherein said image chamber contains an imaging phosphor having rapid self-discharging, high conversion efficiency, electron trapping properties.

5. Apparatus for generating three dimensional images as defined in claim 1 wherein said image chamber contains phosphorous particles suspended through an inside portion of said image chamber.

* * * * *